(12) United States Patent
Rose

(10) Patent No.: US 6,195,561 B1
(45) Date of Patent: Feb. 27, 2001

(54) ANTENNA SYSTEM FOR TWO-WAY UHF UNDERGROUND RADIO SYSTEM

(75) Inventor: Mark D. Rose, Corvallis, OR (US)

(73) Assignee: Tunnel Radio of America, Inc., Corvallis, OR (US)

(*) Notice: Subject to any disclaimer, the term of this patent is extended or adjusted under 35 U.S.C. 154(b) by 0 days.

(21) Appl. No.: 09/110,064

(22) Filed: Jul. 3, 1998

(51) Int. Cl.[7] .................................................. H04B 7/14
(52) U.S. Cl. .............................................. 455/523; 455/11.1
(58) Field of Search ........................... 455/4.1, 15, 523, 455/129, 7, 11.1; 324/316, 639; 343/754; 370/407, 297

(56) References Cited

U.S. PATENT DOCUMENTS

| | | | |
|---|---|---|---|
| 3,665,480 | * 5/1972 | Fassett | 343/754 |
| 3,673,497 | * 6/1972 | Thrasher | 455/129 |
| 4,777,652 | * 10/1988 | Stolarczyk | 455/4.1 |
| 4,849,963 | * 7/1989 | Kawano | 370/297 |
| 4,970,722 | * 11/1990 | Preschutti | 370/407 |
| 5,187,803 | * 2/1993 | Sohner | 455/4.1 |
| 5,230,080 | * 7/1993 | Fabre | 455/15 |
| 5,598,097 | * 1/1997 | Scholes | 324/316 |
| 5,809,429 | * 9/1998 | Knop | 455/523 |
| 5,966,016 | * 10/1999 | Suyama | 324/639 |
| 6,032,020 | * 2/2000 | Cook | 455/7 |

\* cited by examiner

Primary Examiner—Nguyen T. Vo
Assistant Examiner—John J Lee
(74) Attorney, Agent, or Firm—Robert D. Varitz, PC

(57) ABSTRACT

An antenna system for a multi-channel, two-way UHF underground communication includes a base radio station; a non-radiating coaxial cable attached to the transmit/receive connector on said base radio station; radiators affixed to said non-radiating coaxial cable at predetermined intervals along the length thereof, wherein said radiator is insulated from the center conductor of said coaxial cable; and bi-directional amplifiers spaced at predetermined intervals along the length of said coaxial cable.

9 Claims, 4 Drawing Sheets

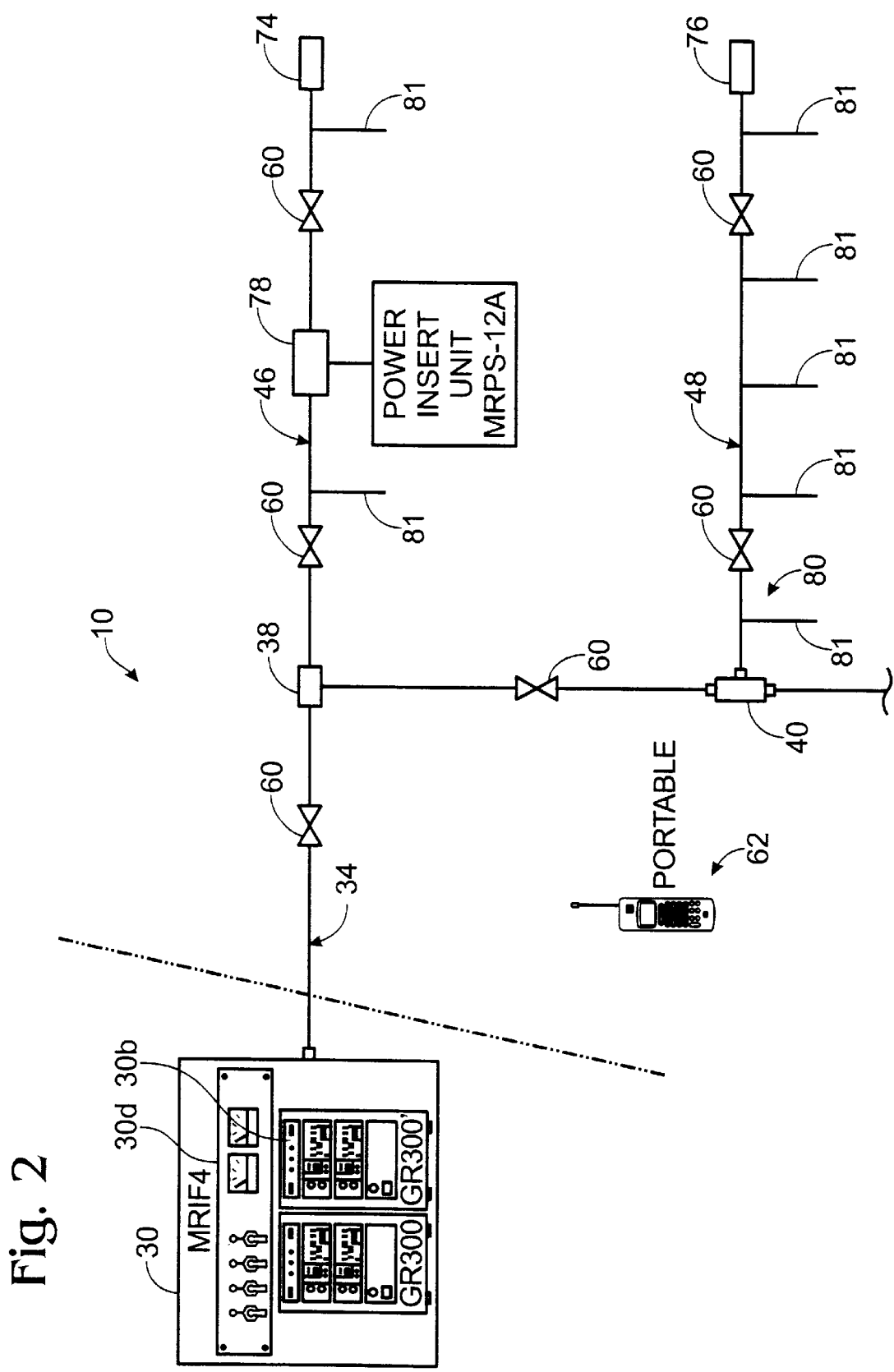

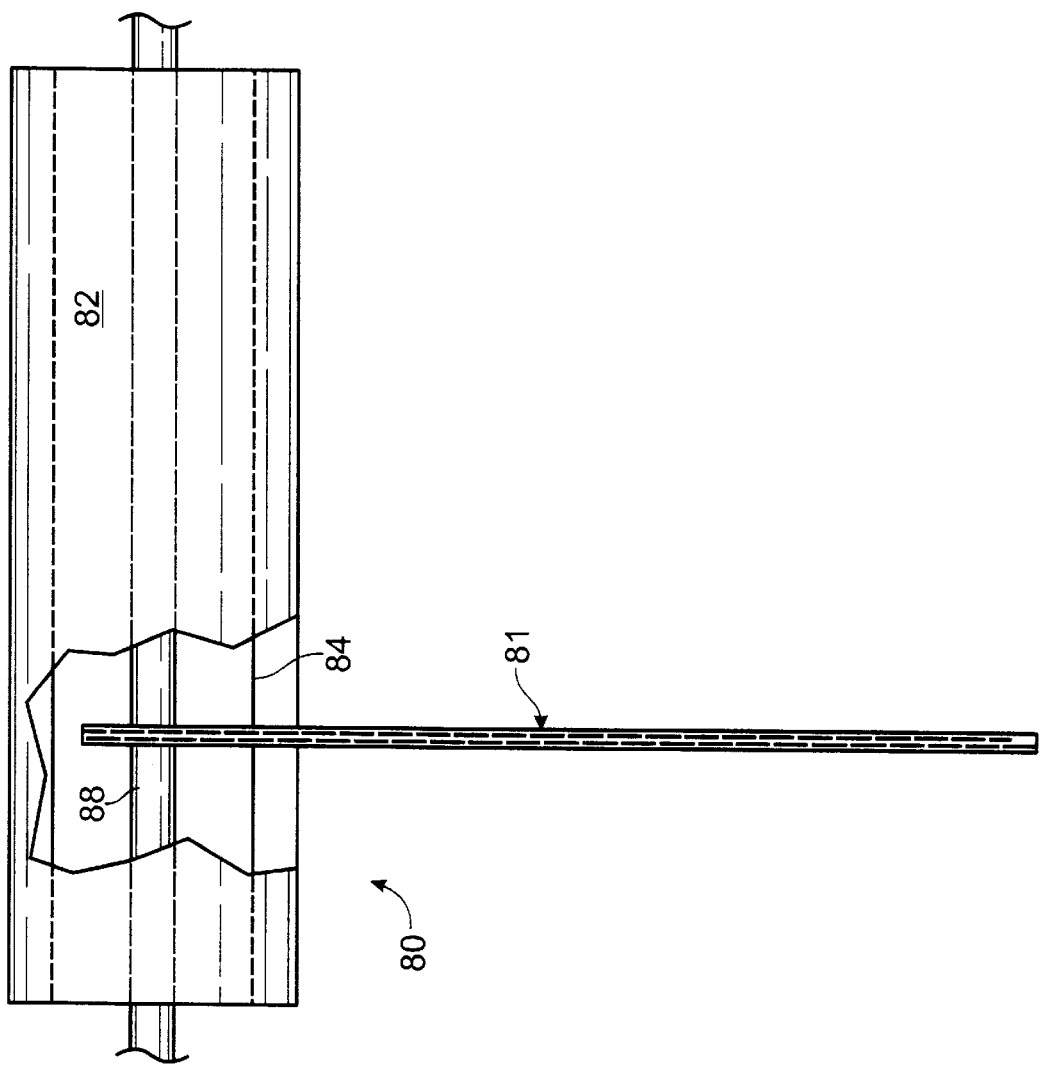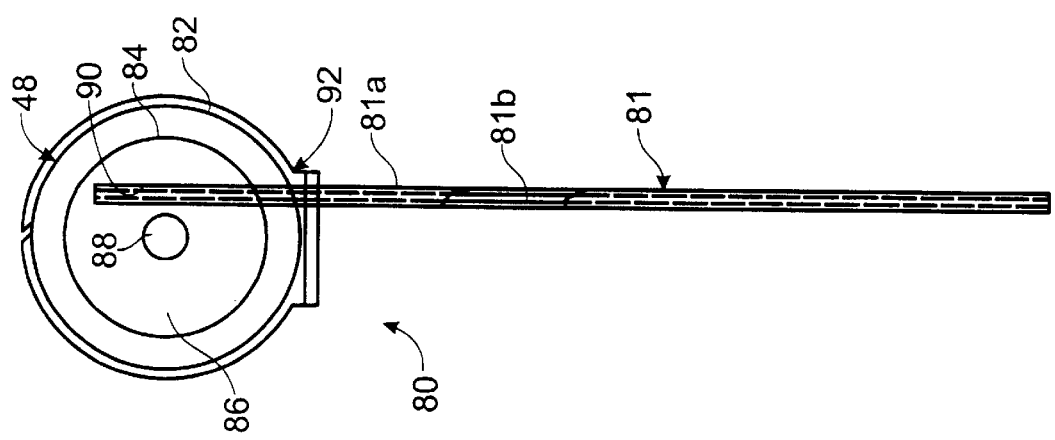

ANTENNA SYSTEM FOR TWO-WAY UHF UNDERGROUND RADIO SYSTEM

FIELD OF THE INVENTION

This invention relates to radio systems, and specifically to an antenna system for a radio system which is designed to operate in shielded environments, such as mines and tunnels.

BACKGROUND OF THE INVENTION

A number of radio systems that are designed to operate in shielded environments, such as mines and long tunnels, are known. One such system is disclosed in U.S. Pat. No. 4,972,505 to Isberg for "Tunnel Distributed Cable Antenna System With Signal Top Coupling Approximately Same Radiated Energy." This system incorporates separate transmitting and receiving antennas and multiple signal taps to adjust the radiated energy.

Another system is described in U.S. Pat. No. 5,230,080 to Fabre et al. for "Ultra-High Frequency Communication Installation." This system is intended for use at a site having multiple underground galleries. The system incorporates multiple repeaters which receive a signal which is retransmitted into the galleries over a combination of radiating and non-radiating cable sections.

A problem with known systems is that the systems require rather larger repeaters or in-line amplifiers, in order to ensure that a radio signal reaches all parts of the underground structure. Frequently, tuned resonant cavity networks have been employed to achieve the desired results, which are both costly and bulky. Additionally, such networks have high signal loss characteristics, which require larger, more powerful, and hence more expensive, amplifiers in order to operate. Such a system is also service intensive, in that frequent service is required in order to maintain the alignment and tuning of the system.

SUMMARY OF THE INVENTION

The antenna system of the invention is intended for multi-channel, two-way UHF underground communication includes a base radio station; a non-radiating coaxial cable attached to the transmit/receive connector on said base radio station; radiators affixed to said non-radiating coaxial cable at predetermined intervals along the length thereof, wherein said radiator is insulated from the center conductor of said coaxial cable; and bi-directional amplifiers spaced at predetermined intervals along the length of said coaxial cable.

An object of the invention is to provide an underground radio system which uses small, relatively inexpensive in-line amplifiers in an antenna system.

Another object of the invention is to provide an antenna system for an underground radio system which is inexpensive to build and easy to maintain.

Another object of the invention is to provide a bi-directional amplifier for use in an antenna system.

Yet another object of the invention is to provide a control radiation antenna, which will radiate RF energy and receive the same.

These and other objects and advantages of the invention will become more fully apparent as the description which follows is read in conjunction with the drawings.

BRIEF DESCRIPTION OF THE DRAWINGS

FIG. 2 is an enlarged portion of the environment of FIG. 1

FIG. 3 is a side elevation of the radiating antenna of the invention.

FIG. 4 is an end elevation of the radiating cable of FIG. 3

DETAILED DESCRIPTION OF THE PREFERRED EMBODIMENT

Figure 1:
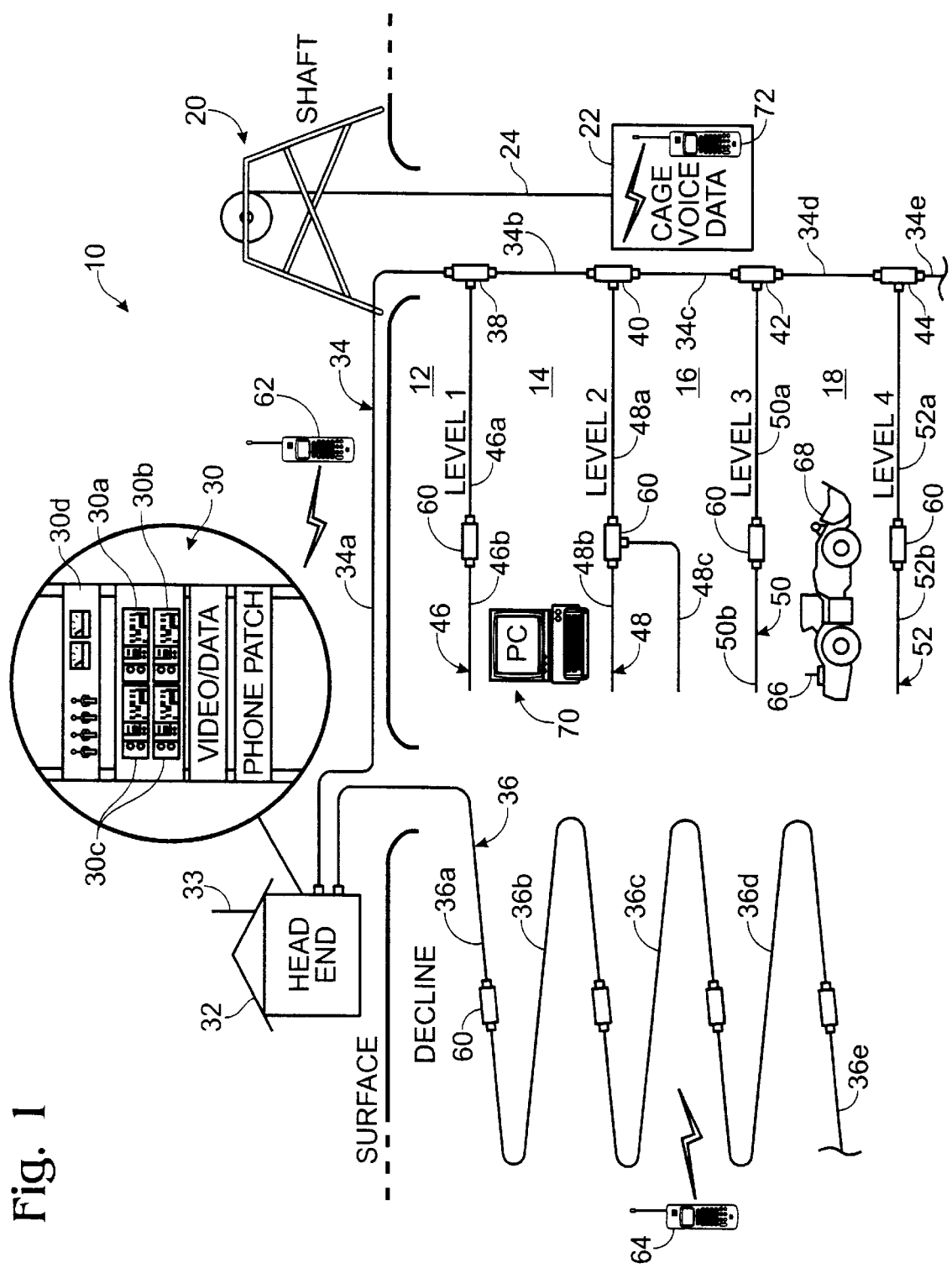
FIG. 1 is a somewhat schematic representation of a shielded environment, such as a mine, wherein the antenna system of the invention is installed.

Referring initially to FIGS. 1 and 2, a mine is depicted generally at 10. Mine 10 includes a number of galleries, or levels, such as level 12, 14, 16, and 18. The radio system for underground mines includes a base station voice repeater and/or data radio, a "head-end" interface unit, and the antenna system.

The mine may also include a lift mechanism 20, which has a car 22 raised and lowered by a elevator mechanism 24. The control mechanism, or base station, for the radio system is shown generally at 30, and may be located in a control room 32 for the mine. The control mechanism includes a base radio or repeater, 30a, and multiplexing portions of the system, which lead to antennas, such as antenna 33, antenna 34 and antenna 36. System components may include the following units: at the head-end, a radio or repeater, such as a Motorola GR300, GR 1225, GR400, or GR500 repeater 30b; an interface, such as a Motorola R.I.C.K. interface, a Zetron 320 repeater controller, 30c: and an interface 30d, such as the TRIF-4U (UHF) interface manufactured by Tunnel Radio of America, Incorporated.

All "head-end" radio equipment is located on the surface, with only the antenna system, including the amplifiers, radiating cable, and junction units, located underground. This is a safety consideration to preclude the use of high-energy radio equipment in an underground environment, and to allow simultaneous surface communication, if equipped with surface antenna 33. The system is intended to operate specifically in the 420–520 megahertz (Mhz) band.

The antenna system of the invention includes two major components: a bi-directional amplifier and a radiating antenna network. Additionally, a complete underground radio system will include a base radio, a multiplexer, a distributed antenna system, and the bi-directional amplifiers of the invention.

From the head-end location, up to four coaxial cables may be used to carry the radio signal to the underground areas. The coaxial cable serves as an extended antenna to any area of the mine that requires radio communication. An amplifier, or signal booster, is required to be placed in line with the radiating cable to maintain the signal level that is lost over the length of the cable at intervals of between 500 and 1600 feet, depending on the system design and performance objectives. The system may branch at any location using a splitter, such as an MURJ3 splitter, or the secondary "F" connector port that is available in the bi-directional amplifier of the invention. The secondary port connection is designed to provide a convenient method to branch the system into areas adjacent to the main antenna run, such as belt lines or other service areas, without cutting the main line and disabling the system for even a short period of time. RG-59 or RG-6 CATV-type cable and connectors may be used to extend such branches.

As shown in FIG. 1, antenna 34 includes three-way splitters 38, 40, 42, and 44. Such splitters allow branches off of antenna 34, such as branch 46, 48, 50, and 52. As is shown in the figure, the mine may extend down to deeper layers or galleries, however, the number shown in the figure is sufficient to explain the invention.

Antenna 36 is a single antenna run without the three-way splitters of antenna 34. Both antennas incorporate bi-directional amplifiers 60, which will be explained in greater detail later herein. Amplifiers 60 are also mounted along the length of branches 46, 48, 50 and 52 of antenna 34, thereby forming antenna segments, such as segments 46a and 46b. The antennas of the system are made from coaxial cable, and specifically from a modified radiating coaxial cable. Such cable enables the passage of RF energy outward from the cable and also enables the cable to pick up radio signals generated by other RF devices, such as hand held transceiver units 62, 64, a transceiver 66, mounted on a piece of mine equipment 68, a below-ground computer 70, or a transceiver 72, which is mounted in car 22. As is shown in FIG. 1, antenna 34 includes multiple antenna segments, such as segments 34a, 34b, 34c, 34d, 34e, and so forth. Likewise, antenna 36 includes antenna segments 36a, 36b, 36c, 36d, 36e, and so forth.

Coaxial cable is used in the antenna of the system. Such cable is of 50 ohm or 75 ohm impedance, with 75 ohm impedance cable being typical. The cable for the antenna mainlines has a one-half or three-quarter inch diameter. It is 100% shielded aluminum, having a copper-clad center conductor and an airspace dielectric between the center conductor and the outer conductor.

In-line amplifiers 60, such as the TR-500A, manufactured by Tunnel Radio of America, Inc., are used with the coaxial cable to extend the range of control mechanism 30. Splitters 38, 40, 42 and 44, such as the MUR-J3 splitter, may be used to branch the radio system. Splitters 38, 40, 42 and 44 are passive devices and pass DC and RF energy through the system. A terminator 74, 76, such as a MRSBT terminator, is located at the end of the coaxial cable in order to cover the exposed conductors and to match the impedance of the transmission line. A splice box, which is used to join two lengths of cable together at a junction that does not require an amplifier or splitter, such as an MRSB-1 splice box. A power insertion supply 78, which is enclosed is an explosion proof box, is located every 5–7 amplifiers. Power insertion supply 78, such as an MRSP-12A, converts 110 VAC to 12 VDC or, uses 12VDC from a battery, in the event that the power mains fail or are turned off. This unit inserts a 12 VDC power supply into the antenna cable to power the amplifier units. In the preferred embodiment, a Crouse-Hinds explosion proof enclosure, such as Model 1745, is used to house the power supply, power inserter, and battery, in an intrinsically safe (IS) environment. Also in the preferred embodiment, a Newmar Power-Pack 7A/H is used for AC to DC filtering and conversion, in addition to providing battery monitoring and current limit control.

A feature of the radiating antenna network of the invention is a controlled radiation antenna, shown generally at 80 in FIGS. 3 and 4. A radiator 81 is formed from a stranded insulated wire, wherein the insulation is formed of TFE or PVC, and the wire is 16 gauge or 18 gauge, respectively. As shown in FIG. 4, radiator 81 is inserted into coaxial cable segment, such as coaxial cable segment 48a such that the insulation 81a completely covers the wire strands 81b. Coaxial cable 48a, as previously noted, is of the radiating type, and includes an outer cover 82, which is usually formed of aluminum, a shielding layer 84, an inner insulation 86, which may be an air gap or other suitable dielectric, and a signal-carrying conductor 88.

Radiator 81 is inserted by drilling a bore 90 in the coaxial cable and then inserting radiator 81 in the bore. Radiator 81 may be secured to cable 48a by means of a plastic cable clamp 92, as shown in FIG. 4, however, if bore 90 is properly drilled and radiator 81 properly inserted in bore 90, the additional clamp should not be required. The radiator is typically nine inches in length and provides a coupling of approximately 20 dB with 0.3 dB line loss. The RF energy radiated from conductor 88 is vertically polarized to achieve maximum coupling to portable or mobile radios, which likely have their antennas oriented to the vertical. RF energy is inductively transmitted through the insulation of the coaxial cable and radiator 81. Radiator 81 length is determined by setting the length to between about 1.35 to 1.5 times the quarter wave of the operating band.

Radiator 81 may be used with air-dielectric coaxial cable of between one-half and one inch OD. Such cable generally has an aluminum outer conductor. Such cable, as manufactured, is non-radiating cable. The use of radiator 81 allows cable 48a to radiate a signal anywhere that a signal is needed, by tapping the antenna segment only where required. This is superior to using the system with conventional radiating coaxial cable, which leaks energy along the entire antenna, thereby requiring more frequent amplification.

The antenna system of the invention may be extended indefinitely until all communication requirements have been filled in the mine environment. An end-of-chain configured amplifier is used as the last amplifier of a chain, isolating DC electric current from extended into permissible zones at the tip of the antenna system. This unit amplifies low level RF energy, but does not allow the passage of any DC voltage into the extending coaxial radiating cable. As previously noted, the end of the each antenna branch requires an MRSB-T terminator for proper antenna system termination of the exposed conductors. Alternately, a quarter wave length inverted ground plane antenna may be used.

Due to the extended range of UHF radio frequency propagation in low-seam mining operations, only passive components are required to be extended into a limited portion of the permissible zone in a coal, or other gaseous, facility. In many cases, no antenna component will be required in the IS zone, i.e., a methane environment, due to the propagation of a 400 Mhz frequency. Therefore, the DC power components of the system may be removed for proper system operation in these relatively small sections of the overall mine facility. Additionally, the component count will be accordingly lowered in such a situation.

Figure 5:
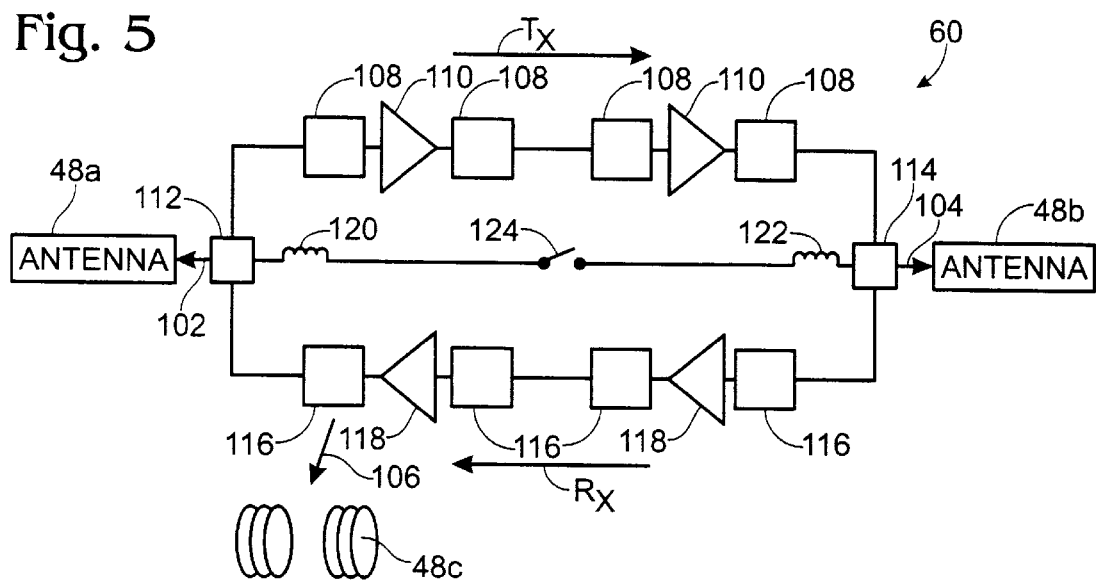
FIG. 5 is a block diagram of the bi-directional amplifier of the invention.

Referring now to FIG. 5, a bi-directional amplifier is depicted generally at 60. Amplifier 60 operates in the range of between 400 and 520 Mhz. The operating channels are typically separated by 19 to 25 Mhz to allow the use of highly selective band-pass filters to provide the isolation required for operation of the bi-directional amplifiers. The base transmit path, arrow Tx, may be in a range of 440 Mhz to 455 Mhz, for example, 451 Mhz, and the associated receive path, arrow Rx, may be in a range of 465 Mhz to 475 Mhz, for example, 469.9 Mhz. This allows for ease of manufacturing and the use of low-cost parts.

Amplifier 60 is manufactured on a single PC card and has a relatively low parts count. As such, the amplifier is easy to service and install. On-board diagnostics with LED indicators are provided, and cable connectors allow direct connection to the distributed antenna system without the use of segment end connectors.

The amplifier may be used with a number of types of radiating cables, including conventional radiating coax, or the previously described air-dielectric cable having radiators inserted therein.

Figure 6:
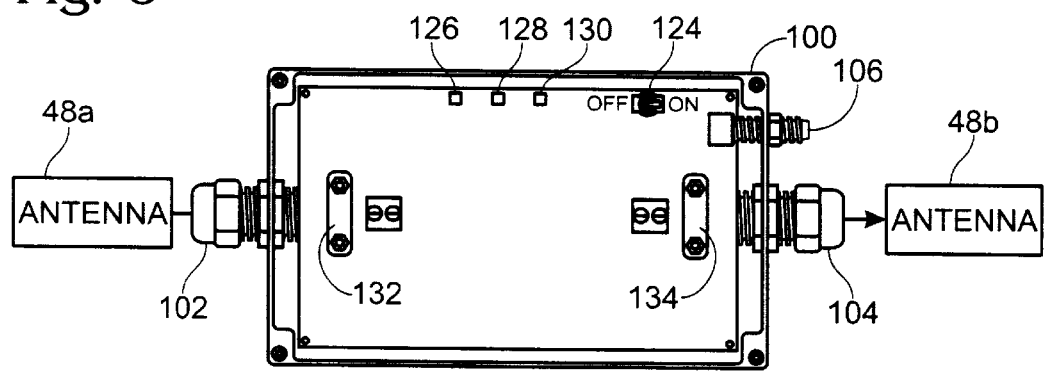
FIG. 6 is a front elevation of the bi-directional amplifier housing of the invention.

Referring now to FIGS. 5 and 6, amplifier 60 is enclosed in a case 100, which includes a base antenna connector 102, which is connected to the "base" side of the antenna. A tunnel antenna connector 104 is connected to that cable which extends from amplifier 60 into the mine. A branching "F" connector 106 is provided to allow amplifier 60 to function as a splitter, and to drive a branch antenna 48c (FIG. 1).

Amplifier 60 incorporates a number of band-pass filter pairs in its transmit and receive side, and also includes discrete transistor amplifiers in its transmit and receive sides. Referring to FIG. 5, the Tx side includes four dual band-pass filters 108, and two discrete transistor amplifiers 110. Filters 108 each include a pair of filters, formed of 22 or 24 guage tinned copper wire, having a diameter of approximately 0.125 inches, with coil spacing of five to seven millimeters. Such an arrangement provides filtering for duplex, 20 Mhz separation, operation of amplifier 60.

The bi-directional amplifier also includes a pair of signal splitter/combiners 112, 114, which are connected to ports 102, 104, repectively. These components include an RF snif circuit which detects an RF level and a low DC voltage. The DC voltage is used to power the bi-directional amplifier.

The Rx side of amplifier 60 includes four pair of band-pass filters 116 and two discrete transistor amplifiers 118. Splitter/combiners 112, 114 are connected by a run having inductors 120, 122, and an off/on switch 124 located therein. Referring now to FIG. 6, indicators, in the form of LEDs, are provided to indicate DC current in, 126, DC current out, 128 and transmit power 130. Switch 124 prevents the passing of DC current on the amplifier output branch. The switch is set to "off" in the end-of-chain configured amplifier that supplies RF energy to the permissible zone. Any amplifier may be configured in this manner. The LEDs indicate the jumper position and presence of output current. If an output lamp is in its "on" position (RED), the output branch is indicated as having DC current available. The LED indicators provide a visual indication of the proper system operation or fault condition, including open circuits or short circuits, in amplifiers or coaxial cable network. The indicators also monitoring amplifier output voltage to the next amplifier in the chain.

In the event that it is desired to connect a radiator, like radiator 81, to amplifier 60, cable clamps 132, 134 are provided, which will receive a radiator.

In some circumstances, the extension of the radio coverage area will be facilitated with the auxiliary port of the bi-directional amplifier. The "F" connector may be used to branch the system a short distance, with the termination into a quarter wave antenna. The controlled radiation antenna of the invention provides a new technique for emitting RF energy from a nonradiating CATV type cable. The underground radio system of the invention has a number of safety enhancements. This is the result of using the bi-directional amplifiers of the invention.

Overall, the system current consumption is quite low, typically less than 2 amps per branch from the head-end, and decreases to slightly less than 100 milliamps operating current in the end-of-chain amplifier near the end of each branch. Each branch incorporates a current limiter/trip-out circuit, which is nominally set to 3 amps, and is adjustable at the head-end. Additionally, an on-off switch is provided for each branch, with an associated volt and amp meter, on-off indicator lamps, which are located in both the head-end assembly and each amplifier.

The RF energy is less than 50 milliwatts maximum output immediately adjacent each bi-directional amplifier. The system is entirely solid state. No relays are used in the underground equipment, which eliminates the possibility of sparks. SMT construction methods, which meet ISO 9001 assembly and inspection parameters, are used in the manufacturing of the components of the bi-directional amplifier.

Current carrying devices are positively terminated. Coaxial terminators are fully sealed in a submersible enclosure with sealed entries. The terminators have clearly visible connections that provide for correct termination and inspection. In the preferred embodiment, internal termination clamps are double screw-and-nut fitted for additional security to prevent loose connections after installation. All exposed components, which are the coaxial cable and amplifier enclosures, are insulated to prevent accident contact with other mine structures or devices.

Each amplifier includes an internal fuse that opens in the event of a short circuit. Additionally, each amplifier incorporates an internal voltage regulator to prevent damage from voltage spikes in the event of a mine power surge, or other fault.

In the event of a system short circuit, the head-end and power insertion units are forced to their "open" position, which activates alarms for the system.

Although a preferred embodiment of the invention, and a variation thereof, have been disclosed, it will be appreciated that further variations and modifications may be made thereto without departing from the scope of the invention as defined in the appended claims.

I claim:

1. An antenna system for a multi-channel, two-way UHF underground communication comprising:

a base radio station for transmitting and receiving RF signals;

plural portable transceivers for transmitting and receiving RF signals;

a non-radiating coaxial cable attached to a transmit/receive connector on said base radio station for transmitting the RF signals;

radiators affixed to said non-radiating coaxial cable at predetermined intervals along the length thereof for transmitting and receiving RF signals, wherein each of said radiators is insulated from a center conductor of said coaxial cable; and bi-directional amplifiers spaced at predetermined intervals along the length of said coaxial cable to boost the RF signal.

2. The system of claim 1 where said radiators include a length of stranded, insulated wire which is placed within said coaxial cable and insulated from the central conductor thereof.

3. The system of claim 1 wherein each of said bi-directional amplifiers includes a connector for said coaxial cable on a base-station side thereof; a connector for said coaxial cable on a tunnel side thereof, and an "F" connector for branching an antenna off each of said bi-direction amplifiers.

4. The system of claim 1 wherein each of said bi-directional amplifiers includes a transmit side having multiple band-pass filters and plural discrete transistor amplifiers, and which operates in a range of about 465 Mhz to 475 Mhz;

a receive side having multiple band-pass filters and plural discrete transistor amplifiers, and which operates in a range of about 440 Mhz to 455 Mhz; and wherein said transmit side and said receive side are joined by a pair of signal splitter/combiners which draw operating current for each of the bi-directional amplifiers from the antenna system.

5. An antenna system for a multi-channel, two-way UHF underground communication comprising:

a base radio station having a transmit/receive connector thereon;

an antenna system; and bi-directional amplifiers spaced at predetermined intervals along the length of said coaxial cable, wherein said bi-directional amplifiers include a single-frequency transmit side having multiple band-pass filters and plural discrete transistor amplifiers, and which operates in a range of about 465 Mhz to 475 Mhz; a single-frequency receive side having multiple band-pass filters and plural discrete transistor amplifiers, and which operates in a range of about 440 Mhz to 455 Mhz; and wherein said transmit side and said receive side are joined by a pair of signal splitter/combiners which draw operating current for each of the bi-directional amplifiers from the antenna system.

6. The system of claim 5 wherein said antenna system includes a non-radiating coaxial cable, having a central conductor, attached to said transmit/receive connector on said base radio station; and radiators affixed to said non-radiating coaxial cable at predetermined intervals alone the length thereof, wherein said radiators include a length of stranded, insulated wire which is placed within said coaxial able and insulated from said central conductor.

7. The system of claim 5 wherein each of said bi-directional amplifiers includes a connector for said coaxial cable on a base-station side thereof; a connector for said coaxial cable on a tunnel side thereof, and an "F" connector for branching an antenna off of each of said bi-direction amplifiers.

8. An antenna system for a multi-channel, two-way UHF underground communication comprising:

a base radio station having a transmit/receive connector thereon;

a non-radiating coaxial cable, having a center conductor, attached to the transmit/receive connector on said base radio station;

radiators affixed to said non-radiating coaxial cable at predetermined intervals along the length thereof, wherein each of said radiators is insulated from a center conductor of said coaxial cable; and bi-directional amplifiers spaced at predetermined intervals along the length of said coaxial cable, wherein each of said bi-directional amplifiers includes a transmit side having multiple band-pass filters and plural discrete transistor amplifiers, and which operates in a range of about 465 Mhz to 475 Mhz; a receive side having multiple band-pass filters and plural discrete transistor amplifiers, and which operates in a range of about 440 Mhz to 455 Mhz; and wherein said transmit side and said receive side are joined by a pair of signal splitter/combiners which draw operating current for each of said bi-directional amplifiers from the antenna system, and wherein each of said bi-directional amplifiers further includes a connector for said coaxial cable on a base-station side thereof, a connector for said coaxial cable on a tunnel side thereof, and an "F" connector for branching an antenna off of each of said bi-direction amplifiers.

9. The system of claim 8 where said radiators include a length of stranded, insulated wire which is placed within said coaxial cable and insulated from the central conductor thereof.

* * * * *